United States Patent [19]

Kobari et al.

[11] Patent Number: 5,578,787
[45] Date of Patent: Nov. 26, 1996

[54] GAS GENERATING AGENT OF AIR BAG INFLATION GAS GENERATOR

[75] Inventors: Hirokazu Kobari; Junichi Kishimoto; Michio Shiota, all of Fukushima-ken, Japan

[73] Assignee: Nippon Koki Co., Ltd., Tokyo, Japan

[21] Appl. No.: 594,418

[22] Filed: Jan. 31, 1996

Related U.S. Application Data

[63] Continuation of Ser. No. 526,196, Sep. 11, 1995, abandoned, which is a continuation of Ser. No. 97,975, Jul. 27, 1993, abandoned.

[51] Int. Cl.$^6$ ..................................................... C06D 5/06
[52] U.S. Cl. ........................... 102/288; 102/290; 102/289
[58] Field of Search .................................. 102/288, 289, 102/290, 291

[56] References Cited

U.S. PATENT DOCUMENTS

| 4,817,828 | 4/1989 | Goetz ................................. 102/288 X |
| 4,994,212 | 2/1991 | Vos et al. ............................ 11/11 X |
| 5,084,218 | 1/1992 | Vos et al. ............................ 269/3.4 |
| 5,101,730 | 7/1992 | Bender et al. ....................... 102/288 |

Primary Examiner—Peter A. Nelson
Attorney, Agent, or Firm—Kalish & Gilster

[57] ABSTRACT

This invention relates to an air bag inflation gas generator used to inflate air bags such as air bags for impact safety devices, life jackets, rafts, and escape chutes, and particularly to a gas generating agent disposed within the device to generate a combustion gas. This invention is structured by forming spacer projections, to keep adjacent gas generating agent; bodies at certain intervals, on one side of the gas generating agent bodies having a through hole formed in the axial direction.

8 Claims, 5 Drawing Sheets

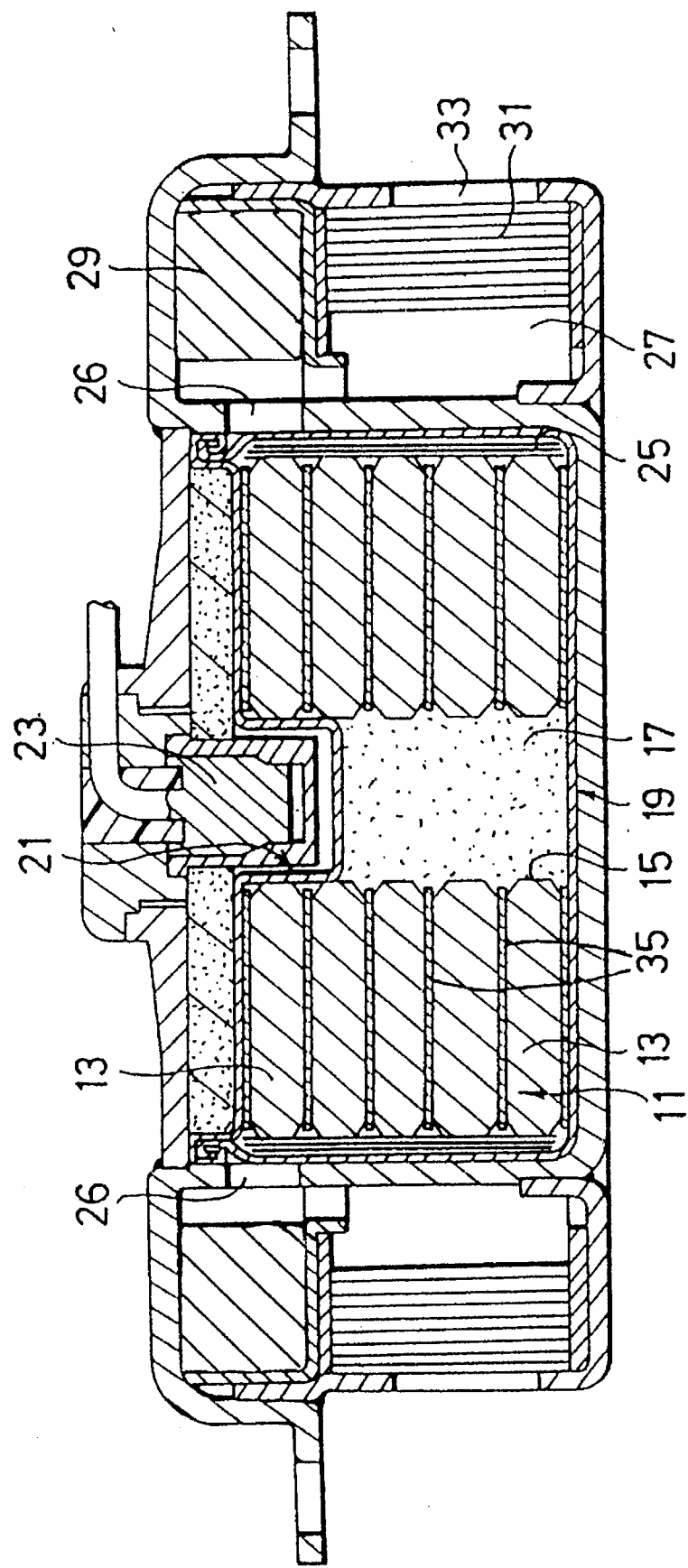
FIG.7 (Known Art)

1

GAS GENERATING AGENT OF AIR BAG INFLATION GAS GENERATOR

This application is a file wrapper continuation of application Ser. No. 526,196, filed Sep. 11, 1995, now abandoned, which is a file wrapper continuation of application Ser. No. 08/097,975 filed Jul. 27, 1993, now abandoned

BACKGROUND OF THE INVENTION

1. Field of the Invention

This invention relates to an air bag inflation gas generator used to inflate air bags such as air bags for impact safety devices, life jackets, rafts, and escape chutes, and particularly to a gas generating agent disposed within the device to generate a combustion gas.

2. Description of the Known Art

A known shock absorber to protect a passenger car driver from shocks at a collision accident comprises an air bag having a capacity of, for example, 60 liters and a gas generator to inflate the air bag with gas. At a collision accident of a passenger car, explosives or other gas generating agents having a similar composition thereto, which are charged in the gas generator, are ignited and burnt to produce gas. The air bag is instantaneously inflated by the resultant gas to protect the driver against any collision shocks, thereby avoiding possible serious injury of the driver.

FIG. 7 shows a known air bag inflation gas generator disclosed in Japanese Patent Application Laid-open Print No. 155857/1990. In the drawing, the reference numeral 11 shows a combustion chamber containing a plurality of gas generating agents 13 in the stacked state.

The gas generating agents 13 are a circular plate having a through hole 15 at the center, and the through hole 15 accommodates an ignition agent 17.

These gas generating agents 13 are accommodated in a concealed container 19. At the center of this concealed container 19, a concave part 21 is formed to be depressed toward the through hole 15 of the gas generating agents 13.

In the concave part 21 is provided an igniter 23 to burn the gas generating agents 13.

The combustion chamber 11 has a combustion chamber filter 25 disposed along its inner wall. And, a plenum chamber 27 annularly surrounds the combustion chamber 11 and receives gas flow through an orifice 26 from the combustion chamber filter 25.

The plenum chamber 27 contains a plenum chamber filter consisting of an upper filter 29 and a gas filter 31.

And, the plenum chamber 27 contains a gas outlet 33 to supply the gas flow from the gas filter 31 to an air bag.

In this type of air bag inflation gas generator, the powder in the igniter 23 burns the ignition agent 17 when the igniter is energized. The ignition agent 17 in turn causes the gas generating agents 13 to burn. Gas from the gas generating agents 13 flows into the plenum chamber 27 through the combustion chamber filter 25 disposed along the inner wall of the combustion chamber 11. The gas is then purified by the upper filter 29 and the gas filter 31 and flows into the air bag through the gas outlet 33. The air bag can be completely inflated within a very short time, for example, approximately 0.04 second.

The known air bag inflation gas generator, however, has drawbacks that the assembling steps are increased and the production costs are increased because a separator 35 is disposed between the gas generating agents 13 to hold the gas generating agents at certain intervals and to ensure the combustion efficiency of the gas generating agents 13.

Since the gas generating agents 13 have the shape of a plate, they may be cracked or chipped when a bending stress or pressing pressure exceeding a certain level is applied during or after stacking them.

Furthermore, since the gas generating agents 13 have the shape of a plate, the separator 35 may prevent the ignition by the flame of the ignition agent 17.

SUMMARY OF THE INVENTION

This invention has been completed to remedy the aforementioned problems, and its object is to provide a gas generating agent of an air bag inflation gas generator which does not need a separator to be disposed between gas generating agents.

Another object of this invention is to provide a gas generating agent of an air bag inflation gas generator which can hold gas generating agent bodies at certain intervals by spacer projections.

Still another object of this invention is to provide a gas generating agent of an air bag inflation gas generator which can not be easily broken by a stress in the axial direction.

Also another object of this invention is to provide a gas generating agent of an air bag inflation gas generator which allows easy ignition by the flame of an ignition agent.

This invention is characterized by spacer projections which are formed, to keep adjacent gas generating agent bodies at certain intervals, on one side of the gas generating agent bodies having a through hole formed in the axial direction.

DESCRIPTION OF THE DRAWINGS

FIG. 7 is a vertical section showing a known air bag inflation gas generator.

DESCRIPTION OF THE PREFERRED EMBODIMENT OF THE INVENTION

This invention will be described in detail with reference to the attached drawings.

Figure 1:
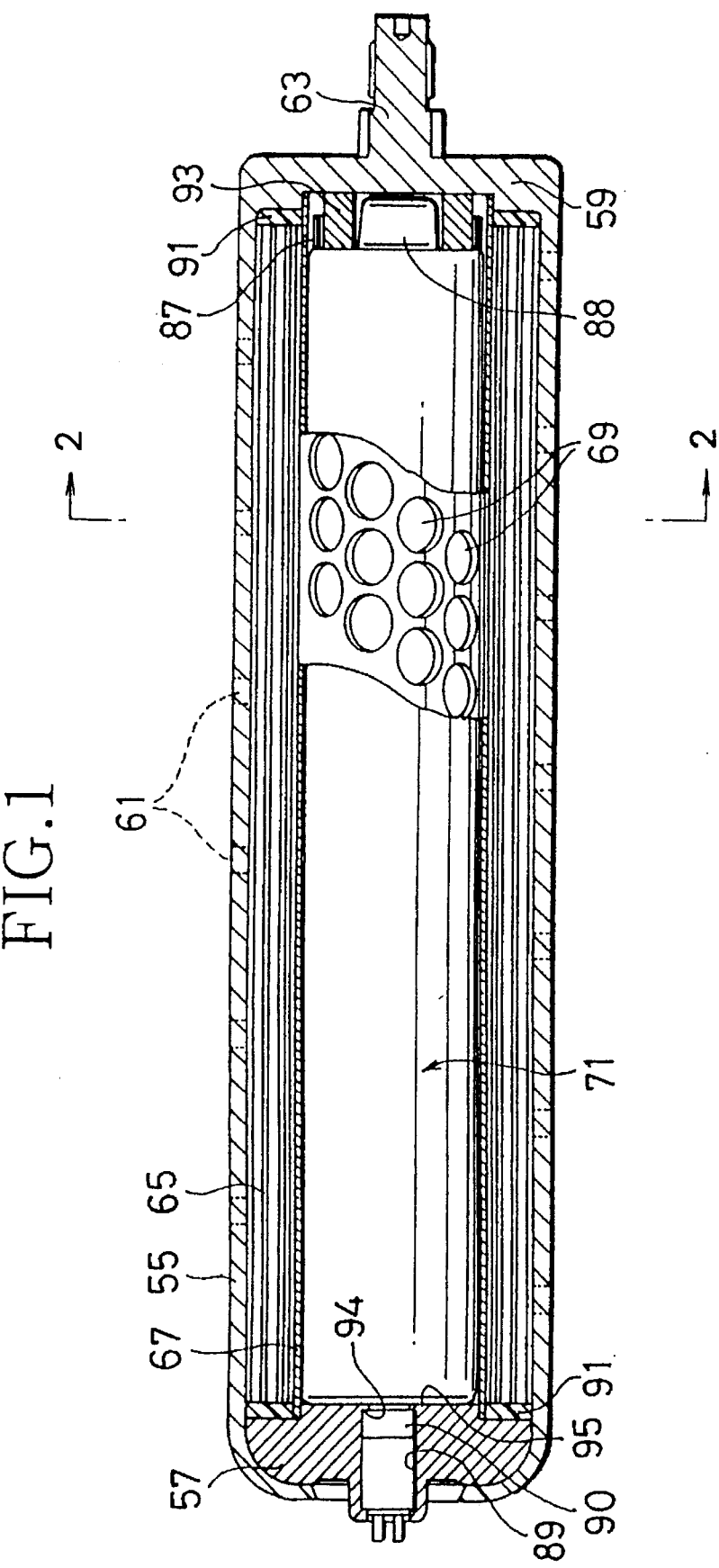
FIG. 1 is a vertical section showing an air bag inflation gas generator having one embodiment of a gas generating agent of this invention.
Figure 2:
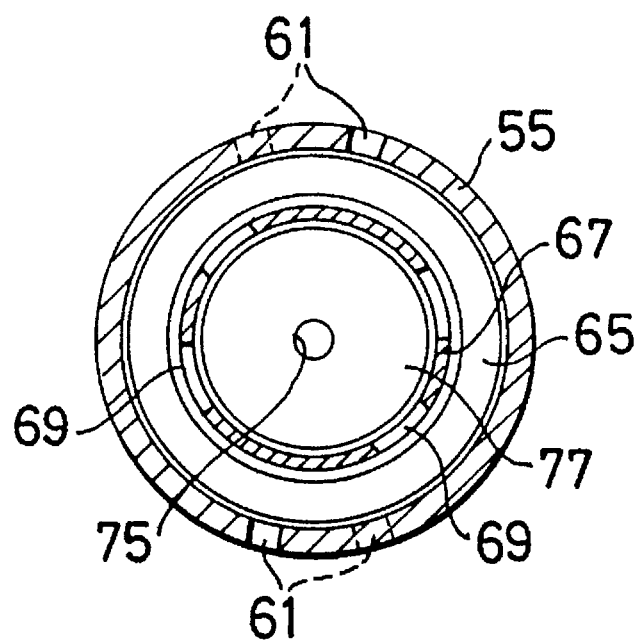
FIG. 2 is a transverse sectional view taken on line 2—2 of FIG. 1.

FIG. 1 and FIG. 2 show an air bag inflation gas generator having one embodiment of a gas generating agent of this invention, and in the drawings, the reference numeral 55 indicates a longitudinal outer cylindrical member sealed by an end plate part 57 on one side and an end plate part 59 on the other side.

The outer periphery of the outer cylindrical member 55 has a number of gas outlets 61 formed.

And, a part 63 to be mounted on a vehicle is integrally formed on the end plate part 59.

The outer cylindrical member 55 has a cylindrical final filter 65 disposed therein.

This final filter 65 is formed by winding, for example, fine-mesh woven metal wire, close-woven metal wire, etc. in layers. This filter has the functions that the combustion gas is cooled so that the air bag is not damaged, the combustion residue contained in the combustion gas is removed, and harmless nitrogen gas only is supplied into the air bag.

Inside the final filter 65 is inserted an inner cylindrical member 67.

The inner cylindrical member 67 has many gas flow openings 69 formed in the entire length of the outer periphery thereof.

The inner cylindrical member 67 accommodates a gas generating agent pack 71.

Figure 3:
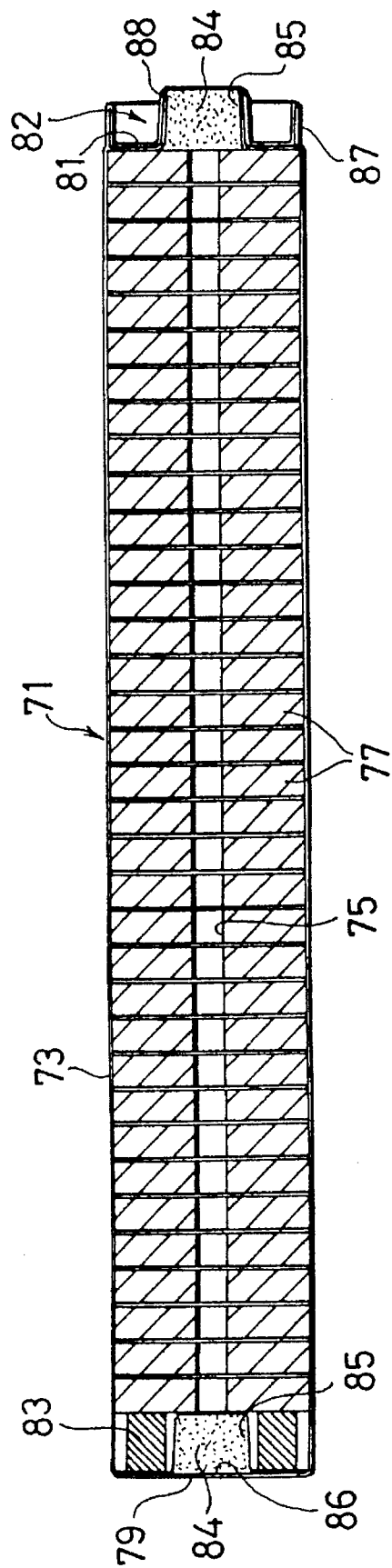
FIG. 3 is a sectional view of the gas generating agent pack of FIG. 1.

The gas generating agent pack 71 has a bottom-closed longitudinal cylindrical pack 73 made of aluminum as shown in FIG. 3.

Within the cylindrical pack 73, many gas generating agents 77 having a through hole 75 formed in their center are accommodated in the stacked state in the axial direction.

One end of the cylindrical pack 73 is sealed by one end face 79, and the other end is sealed by another end face 82 made of, for example, an aluminum cap 81.

At one end of the cylindrical pack 73, a cylindrical cushion material 83 is disposed.

This cushion material 83 is formed of, for example, expanded silicone rubber, which acts as an energizing means to energize the gas generating agents 77 toward the cap 81 with its elasticity.

And, an ignition agent 84 is disposed at the center of the cushion material 83.

The ignition agent 84 is accommodated in an ignition agent pack 85, and a bottom 86 of the ignition agent pack 85 is contacted to the one end face 79 of the cylindrical pack 73.

On the other hand, the cap 81 disposed on the other end of the cylindrical pack 73 is tightly wound around its outer periphery by the cylindrical pack 73 to have a cylindrical fasten-folded section 87.

And, at the center of the cap 81 is formed a projection 88 to accommodate the ignition agent 84.

The ignition agent 84 is accommodated in the ignition agent pack 85.

As shown in FIG. 1, the end plate part 57 sealing one end of the outer cylindrical member 55 is made of an end cap and caulked by the outer cylindrical member 55 for fixing.

At the center of the end plate pare 57, a through hole 89 is formed, and an igniter 90 is inserted into the through hole 89 and caulked by the end plate part 57 for fixing.

A packing 91 made of, for example, inflammable silicone rubber, is disposed between one end of the final filter 65 and the end plate part 57 and between the other end of the final filter 65 and the end plate part 59.

In this embodiment, an energizing member 93 is disposed between the cap 81 forming the other end face 82 of the gas generating agent pack 71 and the end plate part 59 of the outer cylindrical member 55.

This energizing member 93 is cylindrical and disposed between the fasten-folded section 87 and the projection 88.

And, the energizing member 93 is formed of, for example, expanded silicone rubber, which acts as an energizing means to energize the gas generating agent pack 71 toward the igniter 90 with its elasticity.

Figure 4:
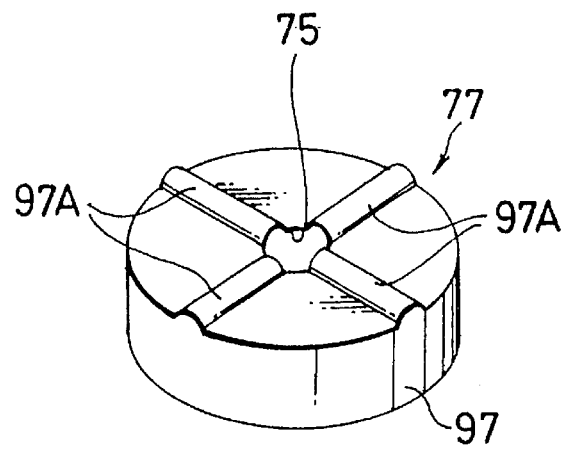
FIG. 4 is a perspective view showing a gas generating agent to be contained in the gas generating agent pack of FIG. 3.

In this embodiment, the gas generating agents 77 have spacer projections 97A formed on one side of a gas generating agent body 97 as shown in FIG. 4 so that the neighboring gas generating agent bodies 97 are kept at certain intervals.

Specifically, the gas generating agent body 97 is circular with the circular through hole 75 formed in its center, and the spacer projections 97A are integrally formed in the shape of cross on one side of the gas generating agent body 97.

And, the spacer projection 97A has its cross section formed into a triangle with its tip tapered.

The shape of the cross section is not limited to a triangle but may be a trapezoid, semicircle or the like, also formed tapered.

The spacer projection 97A preferably has a height of 0.2 to 1 mm to keep a space between the adjacent gas generating agent bodies 97.

With the aforementioned air bag inflation gas generator, the ignition agent 84 burns when electricity is sent to the igniter 90, which in turn burns the gas generating agents 77, the cylindrical pack 73 of the gas generating agent pack 71 is broken at the gas flow openings 69 of the inner cylindrical member 67, the combustion gas flows into the final filter 65 through the gas flow openings 69 of the inner cylindrical member 67 and is purified by the final filter 65, then it is flown into the gas bag through the gas outlets 61 of the outer cylindrical member 55.

Since the gas generating agents of the air bag inflation gas generator constructed as described above have the spacer projections 97A formed on one side of the gas generating agent body 97 which has the through hole 75 formed in the axial direction so that the neighboring gas generating agent bodies 97 are kept at certain intervals, it is easily possible to make a separator disposed between the gas generating agents 77 needless.

As a result, the assembling steps and production costs can be reduced.

And, since the spacer projections 97A are formed in the shape of cross in this embodiment, the gas generating agents 77 are hardly cracked by a stress applied in the axial direction, and the gas generating agents 77 are easily ignited by the flame of the ignition agent 84.

Figure 5:
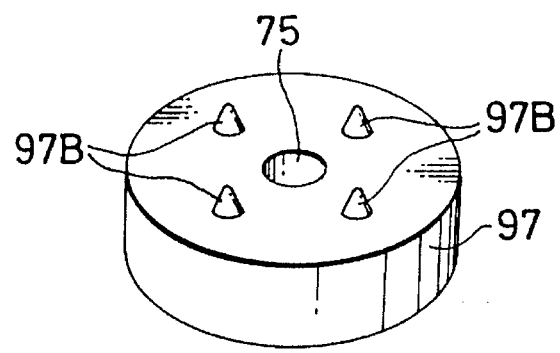
FIG. 5 is a perspective view showing another embodiment of the gas generating agent of this invention.

FIG. 5 shows the gas generating agents of another embodiment of this invention. In this embodiment, a plurality of spacer projections 97B are integrally formed in the shape of a dot on one side of the gas generating agent body 97.

This gas generating agent produces substantially the same effect as in the embodiment shown in FIG. 4.

Figure 6:
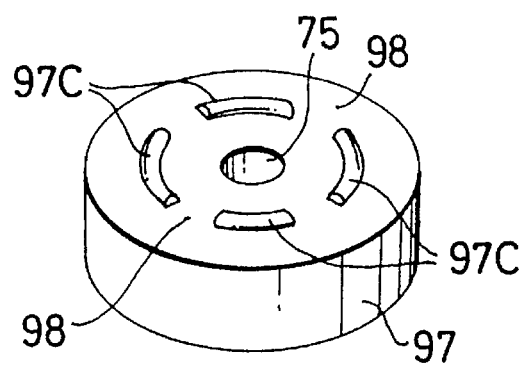
FIG. 6 is a perspective view showing still another embodiment of the gas generating agent of this invention.

FIG. 6 shows the gas generating agents of a still another embodiment of this invention. In this embodiment, spacer projections 97C are integrally formed concentric with the through hole 75 and separated into plural numbers by cutouts 98 on one side of the gas generating agents body 97.

This gas generating agent also produces substantially the same effect as in the embodiment shown in FIG. 4.

What is claimed is:

1. A gas generating agent of an air bag inflation gas generator comprising a plurality of coaxially disposed substantially planar gas generating agent bodies each having a through hole formed in the axial direction and spacer projections formed on one side in order to keep a space between adjacent gas generating agent bodies to thereby enhance ignition, characterized in that the spacer projections are disposed radially and equidistant from one another and further characterized in that the spacer projections are formed as linear stripes extending from the through hole to the outer circumferential surface of the gas generating agent body.

2. A gas generating agent of an air bag inflation gas generator according to claim 1, wherein the spacer projections have a height of 0.2 to 1 mm.

3. A gas generating agent of an air bag inflation gas generator according to claim 1, wherein each of the gas generating agent bodies is circular with a circular through hole formed in its center and projections integrally formed in the shape of a cross on one side thereof, to thereby cause a space to be formed between adjacent gas generating bodies.

4. A gas generating agent of an air bag inflation gas generator according to claim 3, wherein each of the spacer projections has a cross section formed in the shape of a triangle, with its tip tapered.

5. A gas generating agent of an air bag inflation gas generator according to claim 1, wherein each of the gas generating agent bodies is circular with a circular through hole formed in its center and a plurality of projections integrally formed in the shape of a dot on one side thereof and spaced apart from one another to thereby cause a space to be formed between adjacent gas generating agent bodies.

6. A gas generating agent of an air bag inflation gas generator according to claim 1, wherein the gas generating agent body is circular with a circular through hole formed in its center and spacer projections are integrally formed concentric with the through hole and separated into plural numbers by cutouts on one side thereof.

7. A gas generating agent of an air bag inflation gas generator according to claim 3, wherein each of the spacer projections has a cross section formed substantially in the shape of a trapezoid.

8. A gas generating agent of an air bag inflation gas generator according to claim 3, wherein each of the spacer projections has a cross section formed substantially in the shape of a semicircle.

* * * * *